(12) United States Patent
Serlet et al.

(10) Patent No.: US 8,631,209 B2
(45) Date of Patent: Jan. 14, 2014

(54) REUSABLE CONTENT ADDRESSABLE STORES AS BUILDING BLOCKS FOR CREATING LARGE SCALE STORAGE INFRASTRUCTURES

(75) Inventors: Bertrand Serlet, Palo Alto, CA (US); Roger Bodamer, San Carlos, CA (US)

(73) Assignee: upthere, Inc., Palo Alto, CA (US)

( * ) Notice: Subject to any disclaimer, the term of this patent is extended or adjusted under 35 U.S.C. 154(b) by 141 days.

(21) Appl. No.: 13/358,742

(22) Filed: Jan. 26, 2012

(65) Prior Publication Data

US 2013/0198462 A1 Aug. 1, 2013

(51) Int. Cl.
*G06F 12/00* (2006.01)

(52) U.S. Cl.
USPC ........... 711/142; 711/108; 711/118; 711/151; 711/156; 711/162; 711/170; 711/171; 711/216; 707/610; 707/747

(58) Field of Classification Search
USPC ......... 711/142, 108, 118, 151, 156, 162, 170, 711/171, 216; 707/610, 747
See application file for complete search history.

(56) References Cited

U.S. PATENT DOCUMENTS

| | | | | |
|---|---|---|---|---|
| 7,535,485 | B2* | 5/2009 | Elbaz et al. | 348/14.12 |
| 8,156,429 | B2* | 4/2012 | Lotenberg | 715/255 |
| 8,223,191 | B2* | 7/2012 | Elbaz et al. | 348/14.12 |
| 2010/0058054 | A1* | 3/2010 | Irvine | 713/165 |
| 2010/0064354 | A1* | 3/2010 | Irvine | 726/5 |
| 2010/0070698 | A1 | 3/2010 | Ungureanu et al. | |
| 2011/0010578 | A1 | 1/2011 | Dominguez et al. | |
| 2011/0307447 | A1* | 12/2011 | Sabaa et al. | 707/637 |
| 2012/0124105 | A1 | 5/2012 | Provenzano | |
| 2012/0159098 | A1 | 6/2012 | Cheung et al. | |
| 2012/0210120 | A1* | 8/2012 | Irvine | 713/150 |
| 2012/0215980 | A1* | 8/2012 | Auchmoody et al. | 711/118 |
| 2012/0221524 | A1* | 8/2012 | Auchmoody et al. | 707/640 |
| 2012/0311339 | A1* | 12/2012 | Irvine | 713/176 |
| 2013/0061049 | A1* | 3/2013 | Irvine | 713/165 |
| 2013/0198475 | A1 | 8/2013 | Serlet et al. | |

OTHER PUBLICATIONS

"Content-Addressable Storage ' Wikipedia, the free encyclopedia" downloaded from the Internet: http://web.archive.org/web/20121113190903/http://en.wikipedia.org/wiki/Content-addressable_storage 2012 (4 pages).

(Continued)

*Primary Examiner* — Stephen Elmore
(74) *Attorney, Agent, or Firm* — Hickman Palermo Truong Becker Bingham Wong LLP (57) ABSTRACT

Techniques are described for using chunk stores as building blocks to construct larger chunk stores. A chunk store constructed of other chunk stores (a composite chunk store) may have any number and type of building block chunk stores. Further, the building block chunk stores within a composite chunk store may be arranged in any manner, resulting in any number of levels within the composite chunk store. The building block chunk stores expose a common interface, and apply the same hash function to content of chunks to produce the access key for the chunks. Because the access key is based on content, all copies of the same chunk will have the same access key, regardless of the chunk store that is managing the copy. In addition, no other chunk will have that same access key.

25 Claims, 4 Drawing Sheets

(56) References Cited

OTHER PUBLICATIONS

Strzelczak, P. et al., "Concurrent Deletion in a Distributed Content-Addressable Storage System with Global Deduplication" downloaded from the Internet https://www.usenix.org/system/files/conference/fast13/fast13-final91.pdf 2013 USENIX Association (pp. 161-174).

Ungureanu, C. et al., "HydraFS: a High-Throughput File System for the HYDRAstor Content-Addressable Storage System" downloaded from the Internet http://static.usenix.org/event/fast10/tech/full_papers/ungureanu.pdf Feb. 2012 NEC Laboratories America (14 pages).

Rhea, S. et al., "Fast, Inexpensive Content-Addressed Storage in Foundation" downloaded from the Internet http://zoo.cs.yale.edu/classes/cs426/2012/bib/rhea08fast.pdf Proceedings of the 2008 USENX Annual Technical Conference (14 pages).

Suzaki, K. et al., "Analysis of Disk Access Patterns on File Systems for Content Addressable Storage" downloaded from the Internet https://www.kernel.org/doc/ols/2011/ols/2011-suzaki.pdf 2011 Linux Symposium (13 pages).

"Designing Rhino DHT—A fault tolerant, dynamically distributed, hash table—Ayende@ . . . " http:/web.archive.org/web//20120122041007/http:/ayende.com/blog/3934/designing-rhino- . . . 2009 (9 pages).

Zhao, J. et al., "Achieving Reliability Through Reputation in a Wide-Area Network PHT Storage System" 2007 (8 pages).

"Distributed Hash Table—Wikipedia, the free encyclopedia" downloaded from the Internet: http://web.archive.org/web/20120103125147/ http:/en.wikipedia.org/wiki/Distributed hash . . . Dec. 2011 (5 pages).

\* cited by examiner

REUSABLE CONTENT ADDRESSABLE STORES AS BUILDING BLOCKS FOR CREATING LARGE SCALE STORAGE INFRASTRUCTURES

FIELD OF THE INVENTION

The present invention relates to storage systems and, more specifically, to techniques for constructing a composite chunk store from a plurality of building block chunk stores.

BACKGROUND

Information that is used to access a stored digital item is referred to herein as the "access key" of the stored item. In typical file systems, stored items are retrieved based on (a) the location at which the items are stored, and (b) a name or identifier of the items. For example, if a file named "foo.txt" is located in a directory named "c:\myfiles\text", then applications may use the pathname "c:\myfiles\text\foo.txt" as the access key to retrieve the file from the file system. Because conventional access keys are based on the location of the items being retrieved, the access keys change when the items are moved. In addition, each copy of an item has a different access key, because each copy is stored at a different location.

In contrast to conventional file systems, Content Addressable Storage (CAS) systems allow applications to retrieve items from storage based on a hash value that is generated from the content of the items. Because CAS systems perform storage-related operations on items based on the hash values generated for the items, and the hash values are based on the content of the items rather than where the items are stored, the applications that request the operations may do so without knowing the number or location of the stored copies of the items. For example, a CAS system may store multiple copies of an item X at locations A, B and C. An application that desires to retrieve item X would do so by sending to the CAS system a hash value that is based on the contents of item X. Based on that hash value, the CAS system would provide to the application a copy of item X retrieved from one of the locations A, B, and C. Thus, the application would obtain item X without knowing where item X was actually stored, how many copies of item X existed, or the specific location from which the retrieved copy was actually obtained.

Storing a digital item, such as a file or a message, often involves making a call to a "chunk storage system". A chunk storage system is a storage system that performs storage operations without understanding the format or content of the digital information itself. Such storage systems are referred to as chuck storage systems because the systems treat all forms of digital items as if those items were merely opaque chunks of data. For example, the same chunk storage system may be used by word processing applications, image management applications, and calendaring systems to respectively store documents, images and appointments. However, from the perspective of the chunk storage system, only one type of item is being stored: opaque chunks of digital information.

Chunk storage systems may be implemented as CAS systems. For example, a chunk storage system may generate a hash value for a chunk by applying a cryptographic hash function (e.g. MD5, SHA-1 or SHA2) to the chunk. The chunk store may then store the chunk, and maintain an index that associates the hash value with the location at which the chunk is stored. When an application subsequently requests retrieval of the chunk, the application provides the hash value to the chunk storage system. The chunk storage system uses the index to locate the chunk associated with the hash value, and provides the chunk thus located to the requesting application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for using chunk stores as building blocks to construct larger chunk stores. A chunk store constructed of other chunk stores is referred to herein as a composite chunk store. The chunk stores of which a composite chunk store is composed are referred to herein as building block chunk stores.

Composite chunk stores may have any number and type of building block chunk stores. Further, the building block chunk stores within a composite chunk store may be arranged in any manner, resulting in any number of levels within the composite chunk store. Within a composite chunk store, building block chunk stores that make calls to other building block chunk stores are referred to herein as intermediate chunk stores.

The building block chunk stores that belong to a composite chunk store may be locally and/or remotely located relative to each other. For example, a single composite chunk store may have building block chunk stores A, B, C and D, where chunk stores A and B are managed by the same computing device, chunk store C is on a different device that is within the same network as chunk stores A and B, and chunk store D is on an entirely different network than chunk stores A, B, and C. By allowing building block chunk stores to be distributed across various networks, the chunk stores that belong to a composite chunk store may be deployed geographically in a very flexible manner to achieve performance goals, such as reducing network latency.

According to one embodiment, each of the building block chunk stores exposes the same interface for receiving requests for chunk operations. In addition, intermediate chunk stores are designed to call other building block chunk stores through that same common interface. Consequently, chunk stores may be added to, removed from, or rearranged within a composite chunk store without fundamentally changing protocol with which the chunk store interactions take place.

According to one embodiment, within a composite chunk store, all building block chunk stores use the same hash function to generate access keys for the chunks they manage. Further, each chunk store applies the hash function to the content of the chunks to generate the access keys for the chunks. By using a common hash function across all building block chunks, and generating the access keys by applying the hash function to the content of the chunks, it is guaranteed that (barring collisions), given any access key, every chunk store within the composite chunk store will either provide the correct chunk, or will not provide any chunk.

Example Composite Chunk Store

Figure 1:
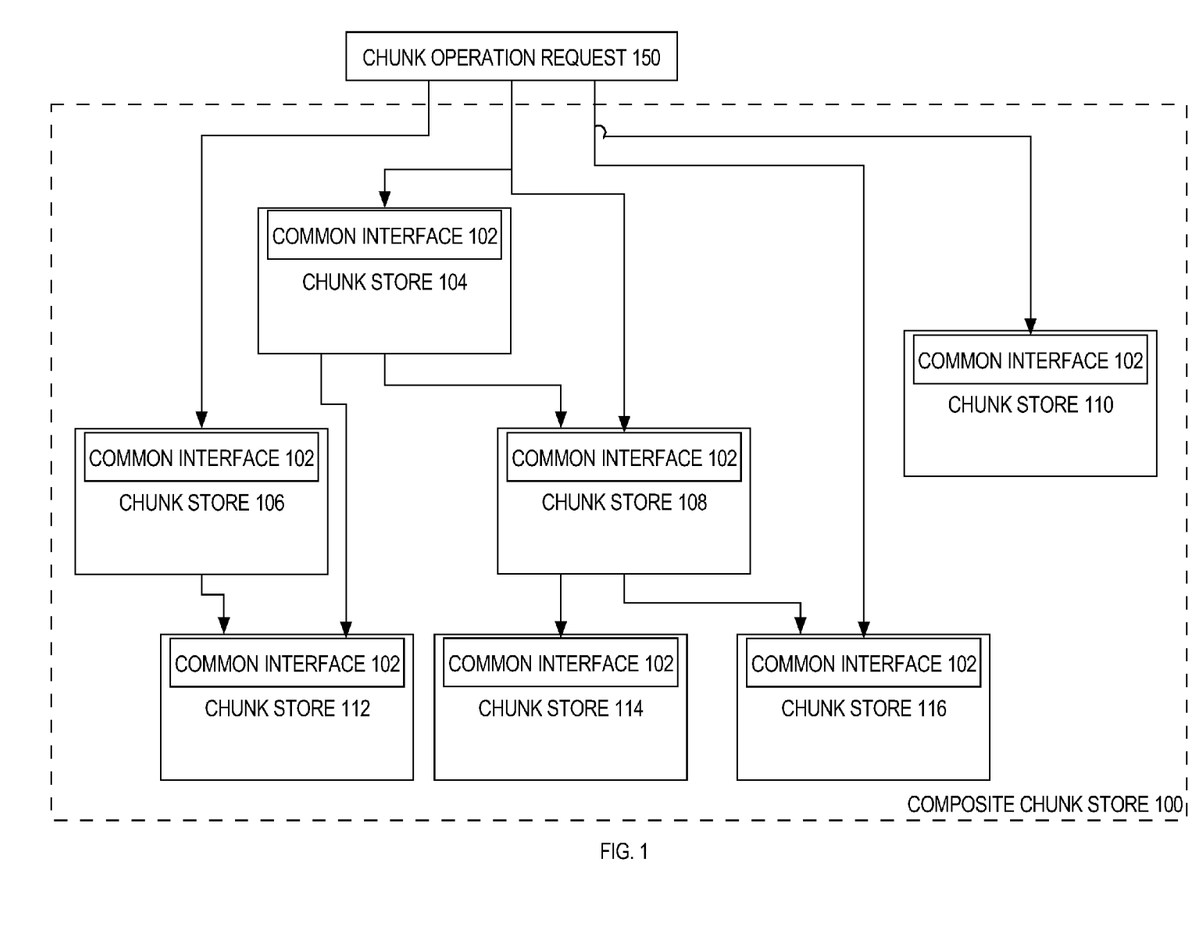
FIG. 1 is a block diagram of a composite chunk store, according to an embodiment of the invention.

Referring to FIG. 1, it is a block diagram illustrating a composite chunk store 100 according to an embodiment of the invention. Composite chunk store 100 includes several building block chunk stores 104, 106, 108, 110, 112, 114 and 116. All building block chunk stores 104, 106, 108, 110, 112, 114 and 116 expose the same interface (common interface 102).

Chunk operation requests from entities external to composite chunk store 100 are made by calling the common interface 102 of one of the building block chunk stores within composite chunk store 100. FIG. 1 illustrates a scenario in which an external chunk operation request 150 is sent directly to the common interface 102 of any one of chunk stores 104, 106, 108, 110 and 116. Upon receiving a chunk operation request 150 a chunk store may forward the request to the common interface 102 of another chunk store. For example, upon receiving an external chunk operation request 150 through its common interface 102, chunk store 140 may issue a chunk operation request to the common interface 102 of chunk store 108. Chunk store 108 may, in turn, issue a chunk operation request to chunk store 116. Thus, a single external chunk operation request 150 may flow through many levels within the composite chunk store 100.

According to one embodiment, external chunk operation requests 150 may also be submitted directly to the chunk store at any level within composite chunk store 100. For example, external chunk operation request 150 may be sent directly to chunk store 116, or directly to chunk store 108. The ability for building block chunk stores to call each other through the same common interface 102, and for external chunk operation requests 150 to be sent directly to chunk stores at any level of composite chunk store 100 through the same common interface 102, allows the internal composition and arrangement of composite chunk stores to be easily customized for the particular needs of a user. In addition, that custom composition and arrangement may be easily modified as a user's needs change.

Generating Access Keys

According to one embodiment, all building block chunk stores within a composite chunk store use the same hash function to generate access keys, and generate the access key for each chunk by applying the hash function to the content of the chunk. According to one embodiment, the hash function is an immutable hash function, where the application of the hash function to a given chunk always produces the same access key. Examples of hash functions that may be used for generating the access keys include, but are not limited to, MD5, SHA-1 and SHA-2.

In many cases, the building block chunk stores of a composite chunk store will be distributed over several computing machines, some of which may be located great distances from the others. However, because all of the building block chunk stores use the same hash function, and the hash function generates hash values based on the content of the chunks, the composite chunk store need not employ complex cache-coherence protocols to ensure that all building block chunks are operating under the same access-key-to-chunk mapping.

Specifically, any of the chunk stores within the composite chunk store that are passed an access key will either be able to retrieve the correct chunk based on the access key, or will not retrieve any chunk based on the access key. No chunk store will have the access key mapped to the wrong chunk. Further, since access keys do not take into account the location of the chunks, access keys do not become "invalid" due to relocation of the corresponding chunks, and all copies of the same chunk will have the same access key regardless of which building block chunk is managing the copy.

Types of Chunk Stores

Figure 2:
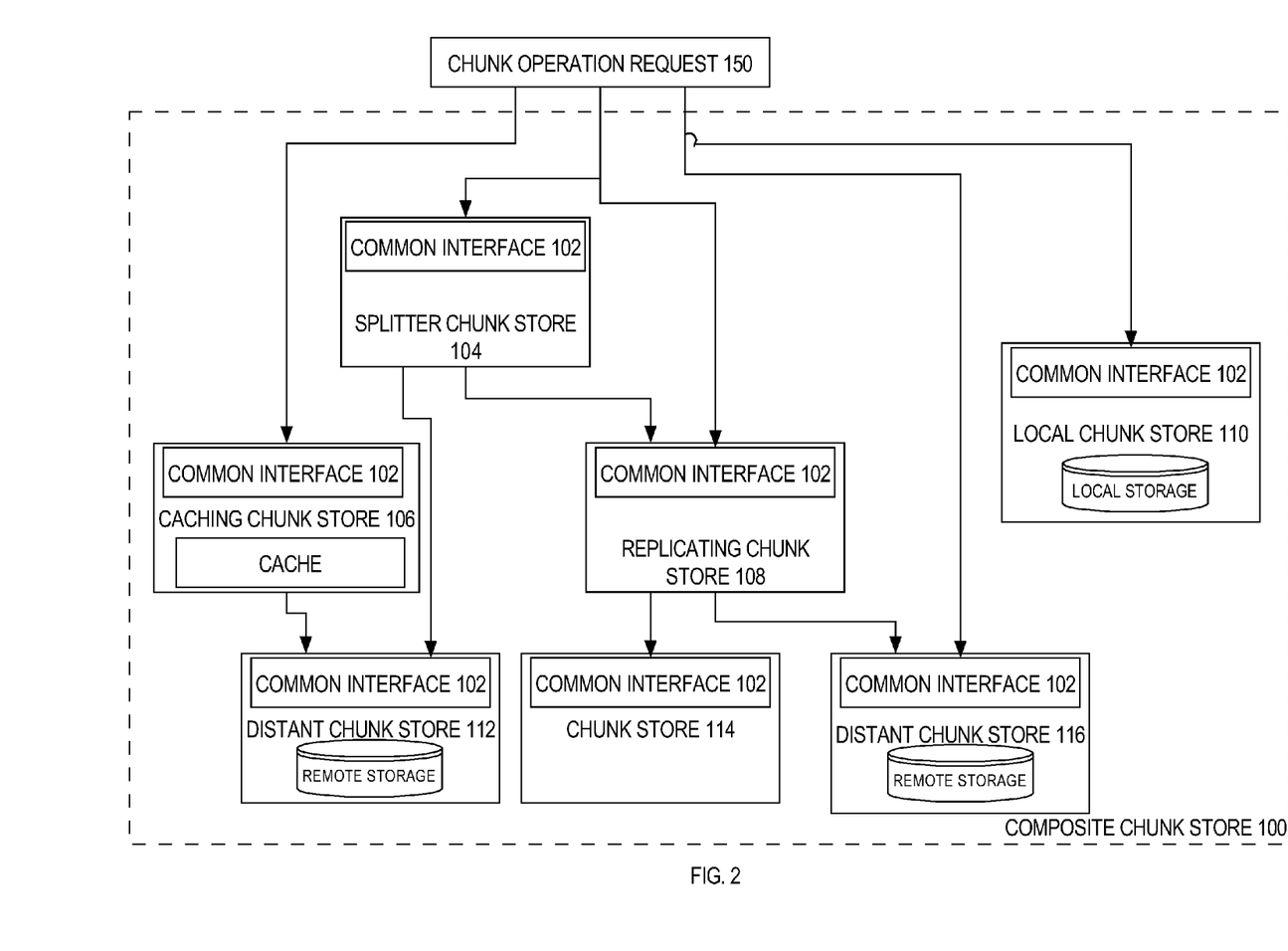
FIG. 2 is a block diagram of the composite chunk store of FIG. 1, illustrating an example of the different types of building block chunk stores that may be combined to form the composite chunk store.

Composite chunk stores, such as composite chunk store 100, may be composed of many different types of building block chunk stores. The types of chunks stores of which a composite chunk store 100 is composed, and how those chunk stores are arranged within the composite chunk store 100, may be adapted to the specific needs of a user. The types of chunk stores that a composite chunk store may composed may include, but are not limited to, local chunk stores, distant chunk stores, caching chunk stores, replicating chunk stores, splitters, intentionally faulty chunk stores and metric-generating chunk stores. FIG. 2 is a block diagram illustrating the composite chunk store 100 of FIG. 1 composed of various different types of chunk stores. Each of these types of chunk stores shall be described in greater detail hereafter.

Local Chunk Stores

A local chunk store is a chunk store that stores chunks in storage that is local to the machine from which external chunk operation requests 150 are issued. In FIG. 2, chunk store 110 is a local chunk store. Generally, performing chunk operations on chunks within a local chunk store 110 will consume less resources than performing chunk operations on remote chunk stores. However, the amount of space available on local storage may be less than is required to store all chunks that composite chunk store 100 is required to manage. Consequently, composite chunk store 100 includes several additional types of chunk stores that do not consume storage that is local to the chunk operation requestor.

Caching Chunk Stores

A caching chunk store serves as a proxy of one or more other chunk stores. Specifically, a caching chunk store temporarily stores copies of a subset of the chunks that are permanently stored at one or more other chunk stores. For example, in FIG. 2, chunk store 106 is illustrated as a caching chunk store that serves as a proxy to chunk store 112. Consequently, chunk store 106 includes a cache that temporarily stores a subset of the chunks that reside on the remote storage on which chunk store 112 stores chunks. When caching chunk store 106 receives a request to retrieve a chunk, caching chunk store 106 first checks its cache for the requested chunk. Caching chunk checks its cache by determining whether any cached chunk is associated with the hash value received in the chunk request. This check may be performed, for example, using an index that indexes the location of cached chunks with the hash values associated with those cached chunks.

If a copy of the requested chunk is in the cache, then caching chunk store 106 provides the chunk without having to forward the request to chunk store 112. If no copy of the requested chunk is in the cache, then caching chunk store 106 calls the common interface 102 of chunk store 112 to retrieve the requested chunk. Upon retrieving the chunk from chunk store 112, caching chunk store 106 provides the chunk to the requestor, and may store a copy of the chunk in its cache. The chunk(s), within the cache of caching chunk store 106, that is replaced to make room for the new chunk store is selected based on a replacement policy implemented by caching chunk store 106. The specific replacement policy used by caching chunk store 106 may vary from implementation to implementation, and may take into account factors such as how recently each cached chunk has been accessed, and how frequently each cached chunk has been accessed.

Upon receiving a request to store a chunk, caching chunk store 106 calls the common interface of chunk store 112 to cause chunk store 112 to store the chunk. Depending on the caching policy implemented by caching chunk store 106, caching chunk store 106 may also cause a copy of the to-be-stored chunk to be stored in its cache.

Different caching chunk stores may implement different policies for handling chunk operation requests. For example, a caching chunk store that implements a "write-through" cache may respond to chunk storage requests by immediately calling another chunk store to store the chunk. On the other hand, a journaling caching chunk store may respond to chunk storage requests by storing the chunk in cache without immediately calling another chunk store. Such journaling caching chunk stores keep a journal to track of which chunks, within their cache, have not yet been sent to another chunk store for storage. At some later time, the journaling caching chunk store may make a call to perform a batch chunk write operation that causes all not-yet-written cached chunks to be stored by another chunk store.

Journaling caching chunk stores may be useful, for example, in scenarios where the cache is large enough to hold all or most of the frequently requested chunks. For example, assume that caching chunk store 106 is a journaling caching chunk store whose cache is large enough to store all or nearly all of the frequently requested chunks that are persistently stored in chunk store 112. Under these conditions, chunk retrieval requests received by caching chunk store 106 will rarely require use of the storage device of chunk store 112. Further, because chunk store 106 is deferring chunk write operations, chunk write requests received by caching chunk store 106 will also rarely require use of the storage device of chunk store 112. Consequently, the storage device of chunk store 112 may be powered down for longer periods of time, decreasing energy consumption and increasing the lifespan of the device.

Distant Chunk Stores

A distant chunk store serves as a proxy to another chunk store such as, but not limited to a local chunk store or a caching chunk store. The interface to the distant chunk store is the same as the interface to the other chunk stores. A distant chunk store makes the network and physical location of other chunk stores transparent. In FIG. 2, chunk stores 112 and 116 are illustrated as distant chunk stores.

Replicating Chunk Stores

A replicating chunk store is a chunk store that is designed to ensure that two or more other chunk stores stay in sync. In the embodiment illustrated in FIG. 2, chunk store 108 is a replicating chunk store 108 responsible for keeping chunk store in sync with chunk store 116. Thus, replicating chunk store 108 responds to any chunk storage request by making calls to both chunk stores 114 and 116 to store the chunk. Replicating chunk stores increase the reliability of the composite chunk store 100 by ensuring that replicated chunks are not lost when one of the synchronized chunk stores fails.

For example, if replicating chunk store 108 keeps chunk stores 114 and 116 in sync, then chunks that were stored in chunk store 114 may be retrieved from chunk store 116 if chunk store 114 fails, and chunks that were stored in chunk store 116 may be retrieved from chunk store 114 is chunk store 116 fails.

Splitters

A splitter is a chunk store that forwards chunk operation requests to other chunk stores based on the range into which the hash value associated with the request belongs. In FIG. 2, chunk store 104 is illustrated as a splitter that forwards chunk operation requests to either chunk store 112 or chunk store 108, depending on the harsh values associated with the requests. For example, splitter chunk store 104 may be designed to forward all chunk operation requests with hash values less than or equal to X to chunk store 112, and all chunk operation requests with hash values greater than X to chunk store 108. In the present example, splitter chunk store 104 splits the requests between two other chunk stores. However, a splitter may split the requests it receives into any number of chunk stores, where each of the chunk stores is forwarded requests associated with a different range of hash values.

Intentionally-Faulty Chunk Stores

An intentionally-faulty chunk store is a chunk store that is intentionally designed to produce erroneous results at least some of the time. For example, an intentionally-faulty chunk store may be designed to perform no action on some of the requests it receives. Alternatively, an intentionally-faulty may return the wrong information, or fail to acknowledge its actions. An intentionally-faulty chunk store may be useful, for example, in testing environments where it is important to determine how other chunk stores, or the composite chunk store as a whole, will react to certain error conditions.

Metric-Generating Chunk Stores

A metric-generating chunk store is a chunk store configured to generate metrics regarding the operations of other chunk stores. For example, a metric-generating chunk store may be designed to forward all chunk operation requests to another chunk store, and to track the time that elapses between when the requests are forwarded, and when responses are received. This is merely one example of the type of metric that a metric-generating chunk store may generate. There is virtually no limit to the type of metrics that may be generated by metric-generating chunk stores.

Null Chunk Stores

A null chunk store is a chunk store that does nothing other than accept and receive requests. A null chunk store may be useful in a variety of environments. For example, a null chunk store may be useful for testing network topologies, where the null chunk store serves as a temporary substitute for a yet-to-be-developed chunk store, similar to a method stub.

Example Real World Use Scenario

Figure 4:
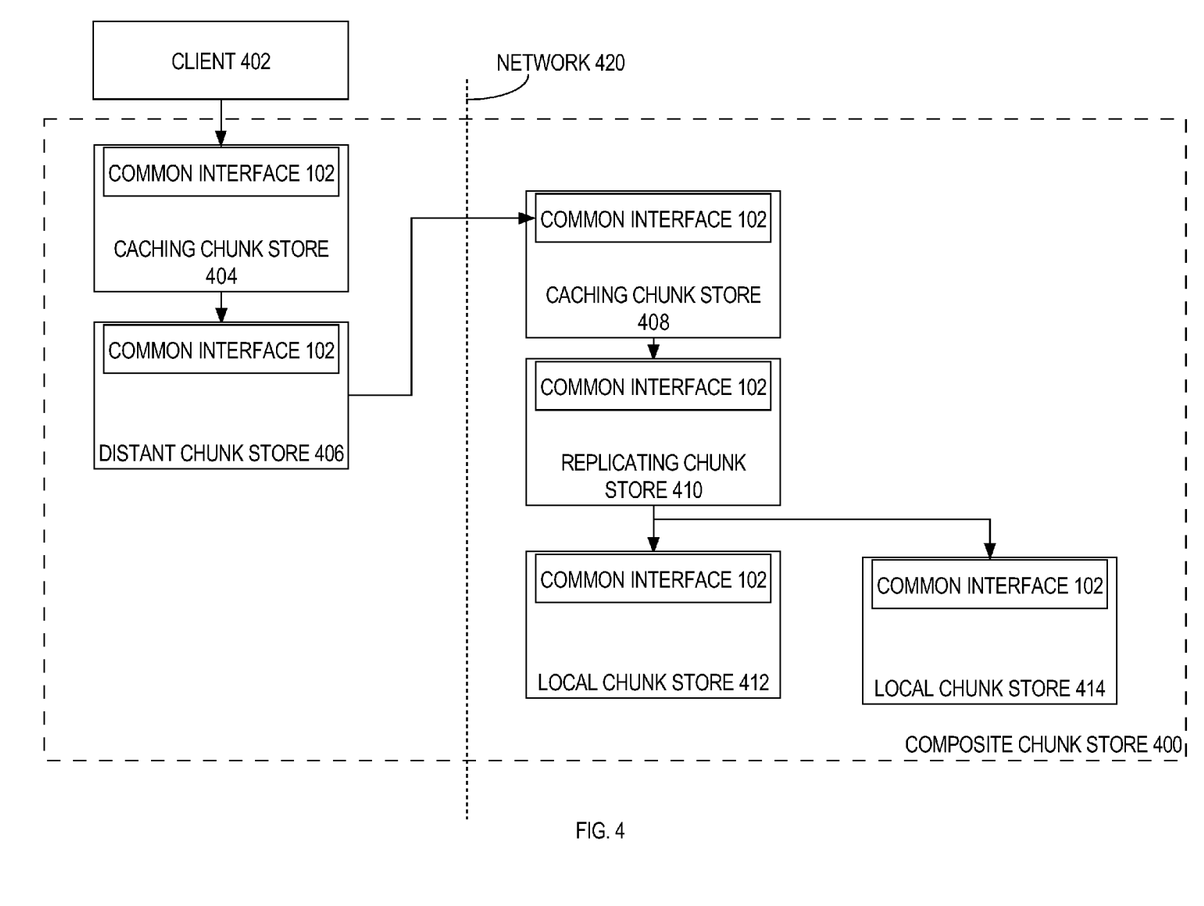
FIG. 4 is a block diagram of a composite chunk store depicting a possible real world use case scenario, according to an embodiment.

Referring to FIG. 4, it is a block diagram that illustrates how a composite chunk store 400 may be configured according to one real world use scenario. As illustrated, a client 402 interacts with the common interface 102 of a caching chunk store 404. The caching chunk store 404, in turn, requests chunks from a distant chunk store 406. Distant chunk store 406 sends chunk requests over a network 420 to the common interface 102 of another caching chunk store 408. Caching chunk store 408 communicates with the common interface 102 of a replicating chunk store 410. Replicating chunk store 410 communicates with two local chunk stores 412 and 414, at which replicas of the chunks used by client 402 may be stored.

Example Common Interface

As mentioned above, all building block chunk stores share a common interface 102. Thus, the protocol with which a building block chunk store is called does not vary based on the nature of the building block chunk store. The specific interface supported by the building block chunk stores of a composite chunk store may vary from implementation to implementation. For example, in one embodiment, the common interface supports the following calls:
  get(access key)—requests retrieval of the chunk associated with the specified access key;
  put(content)—requests storage, as a chunk, of the specified content;
  touch(access key)—updates the metadata of the chunk associated with the specified access key to indicate that the chunk has been used or accessed;
  enumerate(access key range)—lists all chunks whose access keys fall within the specified range.

These are merely examples of the types of functions that may be invoked through the common interface 102. The techniques described herein are not limited to any particular functions, nor the specific parameters thereof.

Metadata

According to one embodiment, metadata about the chunks within a composite chunk store are maintained within the composite chunk store, though each building block chunk store need not have the metadata for each chunk.

The metadata maintained within the composite chunk store for each chunk may include, for example, the size of the chunk, and last-access-date of the chunk. The access key of a chunk is also metadata that is associated with the chunk. However, since the access key may be reproduced from the content of the chunk, the access key need not be explicitly stored separate from the chunk contents itself.

According to one embodiment, the metadata for a given chunk is maintained at least by the chunk store that durably stores the primary copy of the chunk. For chunk stores that store copies of chunks (e.g. local and caching chunk stores), the chunk stores also store access-key-to-storage-location mappings, in order to access chunks based on their access keys.

Customization Options

Using the building-block chunk stores described herein, there is a virtually unlimited number of ways in which composite chunk stores can be custom built to address the needs of a particular user. Those needs may take into account a variety of factors, such as performance, distribution, locality, costs, etc.

For example, as a system grows, additional caching chunk stores may be added between the existing chunk stores and users that are experiencing slow chunk retrieval times. As another example, different chunk stores may be dedicated to specific types of chunks to meet the goals of a user. For example, a composite chunk store may include a chunk store with relatively small but fast storage that is dedicated to storing frequently accessed ("hot") chunks, and another chunk store with relatively large but slower storage that is dedicated to storing infrequently access ("cold") chunks. As the frequency at which a given chunk is accessed changes, the chunk may be migrated from on chunk storage to the other.

A composite chunk store may also include one building block chunk store for storing relatively small chunks, and another building block chunk store for storing relatively large chunks. Any metadata associated with the chunks, such as size, access frequency, access recency, etc. may be used as the basis for dividing storage responsibilities between the building block chuck stores within a composite chunk store.

The ability to customize a composite chunk store makes it easier to obtain the maximum benefit from the hardware available to implement the composite chunk store. For example, a composite chunk store may be customized with multi-level caching (e.g. different caching chunk stores at each level) to take into account how much of each type of storage (e.g. RAM, NAND, SSD, and disk) is available.

Further, as new technologies are developed (e.g. new types of memory), building block chunk stores may be designed to make use of the technologies. Because those building block chunk stores expose the same common interface and employ the same immutable hash function, existing composite chunk stores may be readily reconfigured to incorporate those new building block chunks.

Similarly, if a particular chunk store is improved or updated, the old version of the chunk store may be replaced with the new version of the chunk store with minimal overhead or reconfiguration. For example, if an improved replicating chunk store is developed, an existing replicating chunk store may be replaced with the improved replicating chunk store without significantly modifying the configuration of the composite chunk store.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

The special-purpose computing devices may be desktop computer systems, portable computer systems, handheld devices, networking devices or any other device that incorporates hard-wired and/or program logic to implement the techniques. Any portable device with computing ability may be used to implement the techniques described herein, including but not limited to mobile devices such as tablets, cell phones, PDAs, etc.

Figure 3:
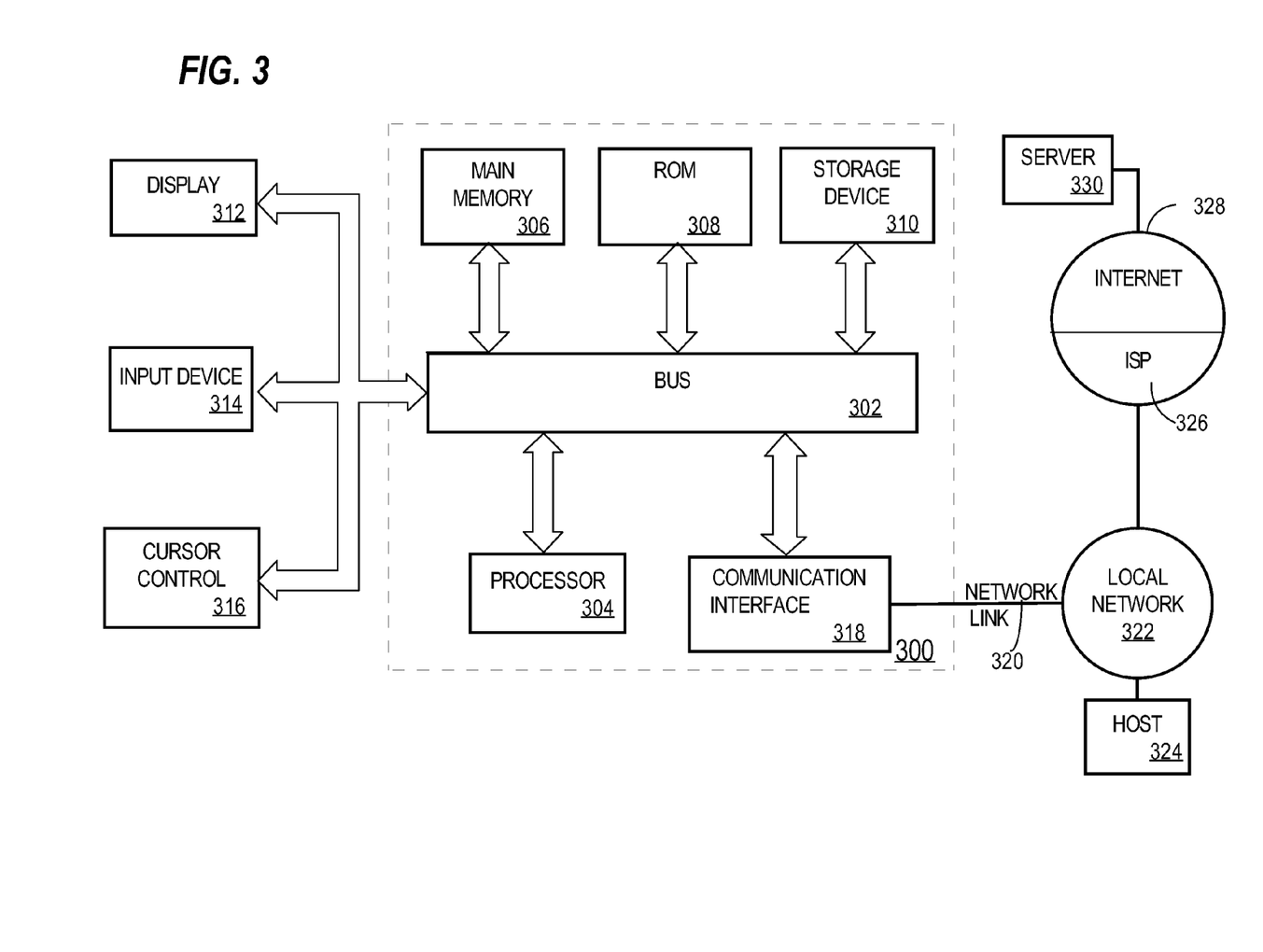
FIG. 3 is a block diagram illustrating a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A composite chunk store comprising one or more computing devices that implement a plurality of building block chunk stores;
wherein each building block chunk store, of the plurality of building block chunk stores, is configured to:
expose a common interface for receiving chunk operation requests; and
use, as access keys for chunks stored in the composite chunk store, hash values produced by applying a particular hash function to contents of the chunks;
wherein the plurality of building block chunk stores include a first chunk store and a second chunk store;
wherein the first chunk store is a different type of chunk store than the second chunk store;
wherein the particular hash function used to produce access keys for the chunks stored in the composite chunk store is the same hash function for all building block chunk stores of the plurality of building block chunk stores.

2. The composite chunk store of claim 1 wherein the first chunk store is configured to call the common interface of one or more other building block chunk stores, of the plurality of building block chunk stores, in response to calls made to the common interface of the first chunk store.

3. The composite chunk store of claim 2 wherein the first chunk store is a caching chunk store.

4. The composite chunk store of claim 3 wherein the first chunk store employs a write-through caching policy.

5. The composite chunk store of claim 3 wherein the first chunk store employs a journaling caching policy.

6. The composite chunk store of claim 2 wherein the first chunk store is a replicating chunk store that is configured to cause at least two other building block chunk stores to remain in sync.

7. The composite chunk store of claim 2 wherein the first chunk store is a splitter chunk store that is configured to forward chunk operation requests to other building block chunk stores based on the access key range into which the access keys specified by the chunk operation requests fall.

8. The composite chunk store of claim 1 wherein the first chunk store is a local chunk store.

9. The composite chunk store of claim 1 wherein the first chunk store is a distant chunk store.

10. The composite chunk store of claim 1 wherein:
the first chunk store is a chunk store configured to store chunks that exceed a particular size; and
the composite chunk store includes another building block chunk store configured to store chunks that are smaller than the particular size.

11. The composite chunk store of claim 1 wherein:
the first chunk store is a chunk store configured to store chunks whose frequency of access exceeds a particular threshold; and
the composite chunk store includes another building block chunk store configured to store chunks whose frequency of access falls below the particular threshold.

12. A method comprising:
receiving, at a common interface of a first chunk store, a first chunk operation request that targets a particular chunk and indicates an access key for the particular chunk;
wherein the first chunk store is one of a plurality of building block chunk stores arranged as part of a composite chunk store;
wherein the first chunk store is a caching chunk store;
wherein the caching chunk store has a cache used to temporarily store copies of chunks for the composite chunk store;
wherein the caching chunk store is not configured to permanently store any chunks for the composite chunk store;
in response to receiving the first chunk operation request, the first chunk store using the access key to determine whether the particular chunk is stored in the cache; and
in response to determining that the particular chunk is not stored in the cache, the first chunk store sending a second chunk operation request to the common interface of a second chunk store that is part of the composite chunk store;
wherein the second chunk operation request targets the particular chunk and indicates the access key for the particular chunk;
in response to receiving the second chunk operation request, the second chunk store using the access key to retrieve the particular chunk from persistent storage;
wherein the same hash function is applied to content of chunks to produce access keys for the chunks, without regard to which building block chunk store, within the composite chunk store, stores the chunks;
wherein the method is performed by one or more computing devices.

13. The method of claim 12 wherein:
multiple types of building block chunk stores, within the composite chunk store, implement said common interface; and
the composite chunk store includes at least one splitter chunk store.

14. The method of claim 12 wherein:
multiple types of building block chunk stores, within the composite chunk store, implement said common interface; and
the composite chunk store includes at least one replicating chunk store.

15. The method of claim 12 wherein:
multiple types of building block chunk stores, within the composite chunk store, implement said common interface; and
the composite chunk store includes at least one distant chunk store.

16. One or more non-transitory computer-readable media storing instructions for a composite chunk store comprising a plurality of building block chunk stores;
wherein each building block chunk store, of the plurality of building block chunk stores, is configured to:
expose a common interface for receiving chunk operation requests; and
use, as access keys for chunks stored in the composite chunk store, hash values produced by applying a particular hash function to contents of the chunks;
wherein the plurality of building block chunk stores include a first chunk store and a second chunk store;
wherein the first chunk store is a different type of chunk store than the second chunk store;

wherein the particular function used to produce access keys for the chunks stored in the composite chunk store is the same hash function for all building block chunk stores of the plurality of building block chunk stores.

17. The one or more non-transitory computer-readable media of claim 16 wherein the first chunk store is configured to call the common interface of one or more other building block chunk stores, of the plurality of building block chunk stores, in response to calls made to the common interface of the first chunk store.

18. The one or more non-transitory computer-readable media of claim 17 wherein the first chunk store is a caching chunk store.

19. The one or more non-transitory computer-readable media of claim 18 wherein the first chunk store employs a write-through caching policy.

20. The one or more non-transitory computer-readable media of claim 18 wherein the first chunk store employs a journaling caching policy.

21. The one or more non-transitory computer-readable media of claim 17 wherein the first chunk store is a replicating chunk store that is configured to cause at least two other building block chunk stores to remain in sync.

22. The one or more non-transitory computer-readable media of claim 17 wherein the first chunk store is a splitter chunk store that is configured to forward chunk operation requests to other building block chunk stores based on the access key range into which the access keys specified by the chunk operation requests fall.

23. The one or more non-transitory computer-readable media of claim 16 wherein the first chunk store is a local chunk store and the second chunk store is a distant chunk store.

24. The one or more non-transitory computer-readable media of claim 16 wherein:
the first chunk store is a chunk store configured to store chunks that exceed a particular size; and
the composite chunk store includes another building block chunk store configured to store chunks that are smaller than the particular size.

25. The one or more non-transitory computer-readable media of claim 16 wherein:
the first chunk store is a chunk store configured to store chunks whose frequency of access exceeds a particular threshold; and
the composite chunk store includes another building block chunk store configured to store chunks whose frequency of access falls below the particular threshold.

* * * * *